March 25, 1941.         A. KINGSBURY         2,235,931
BEARING
Filed May 24, 1938         3 Sheets-Sheet 1
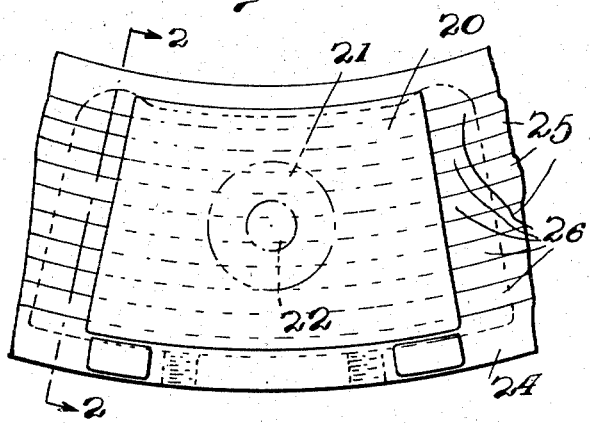
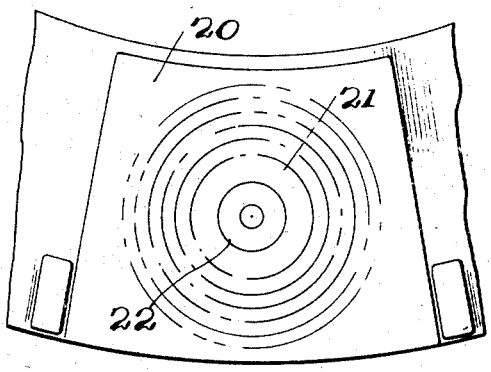
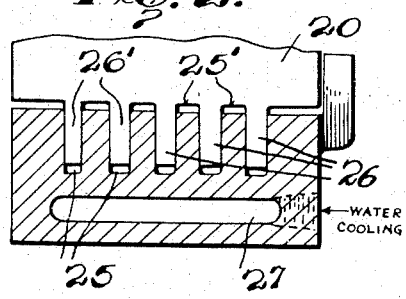
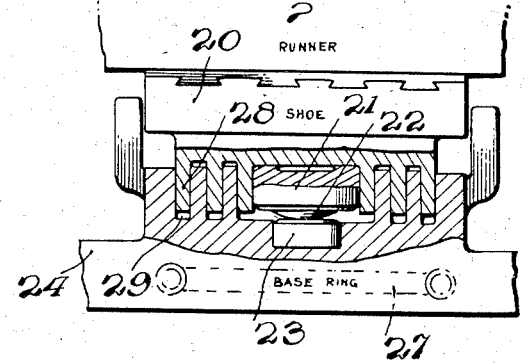
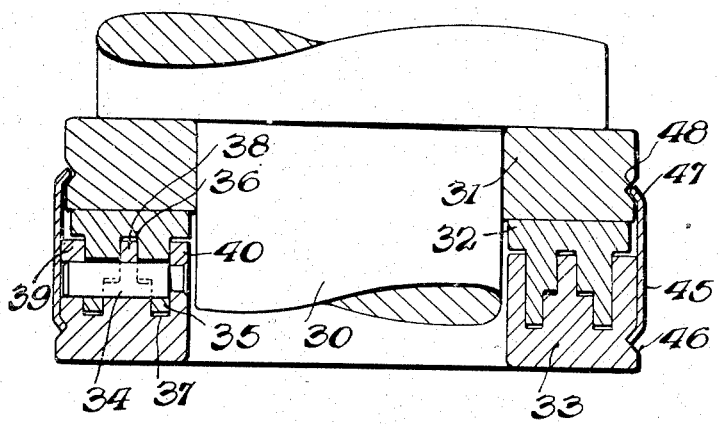
Inventor
Albert Kingsbury.
By Cameron, Kerkam + Sutton
Attorneys March 25, 1941.                A. KINGSBURY                  2,235,931
                                   BEARING
                             Filed May 24, 1938           3 Sheets-Sheet 2
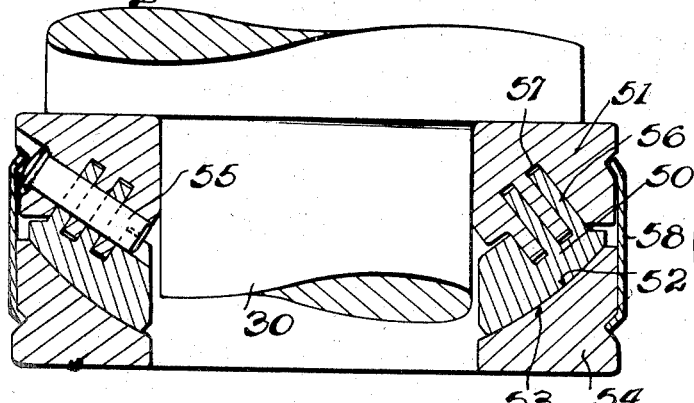
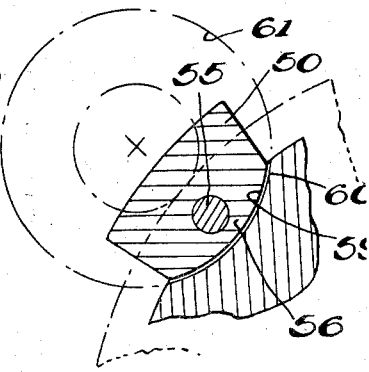
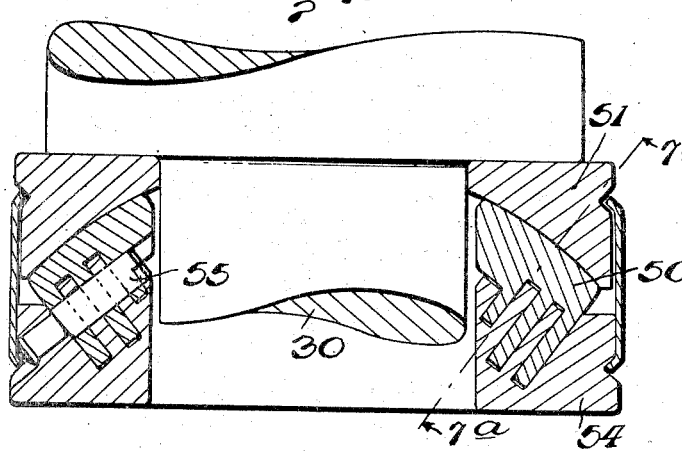
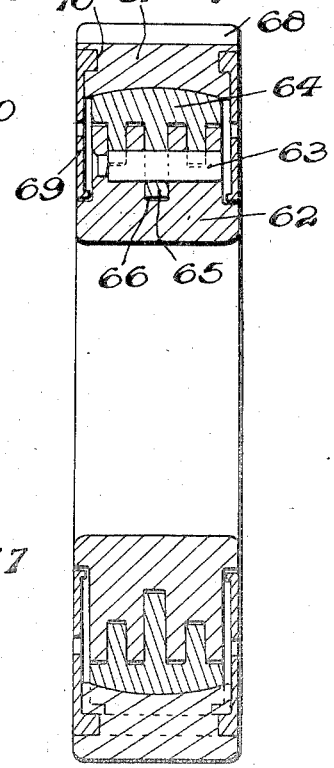
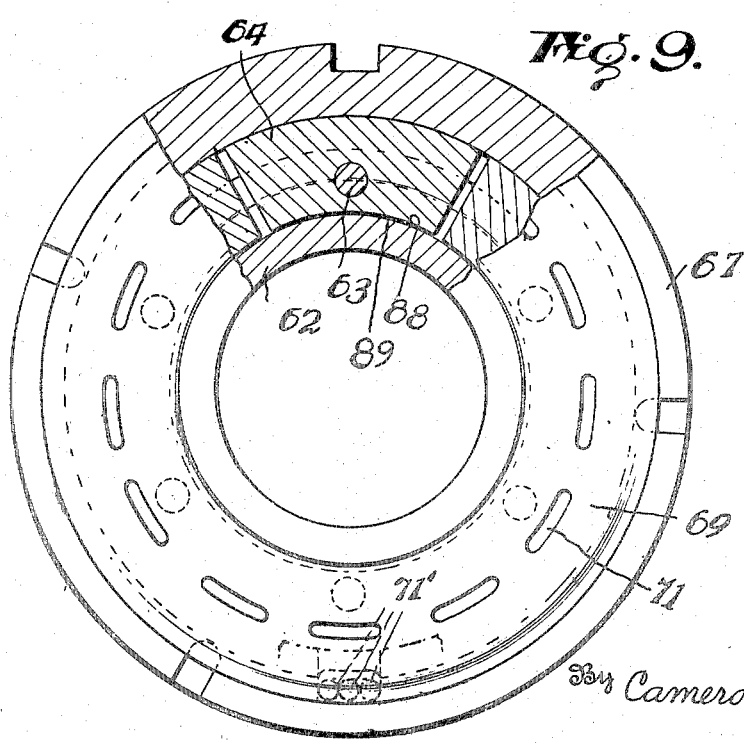
Inventor
Albert Kingsbury.
By Cameron, Kerkam + Sutton
Attorneys March 25, 1941.                A. KINGSBURY                  2,235,931
                                  BEARING
                            Filed May 24, 1938          3 Sheets-Sheet 3
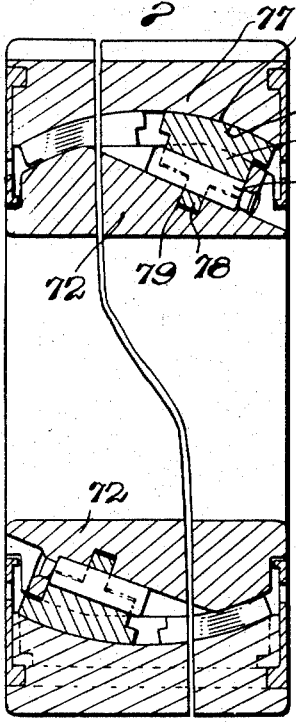
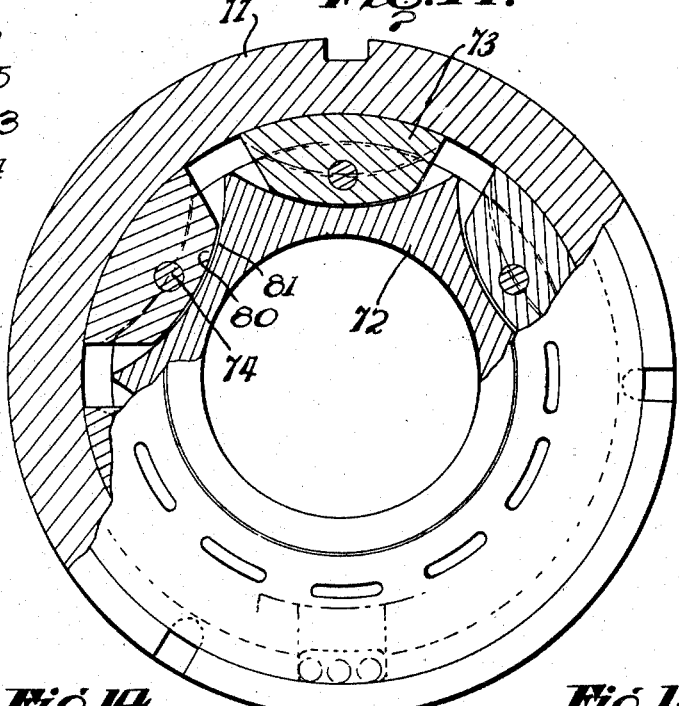
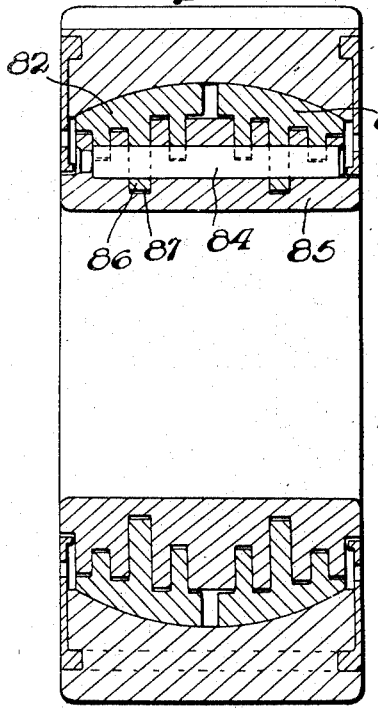
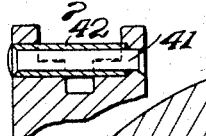
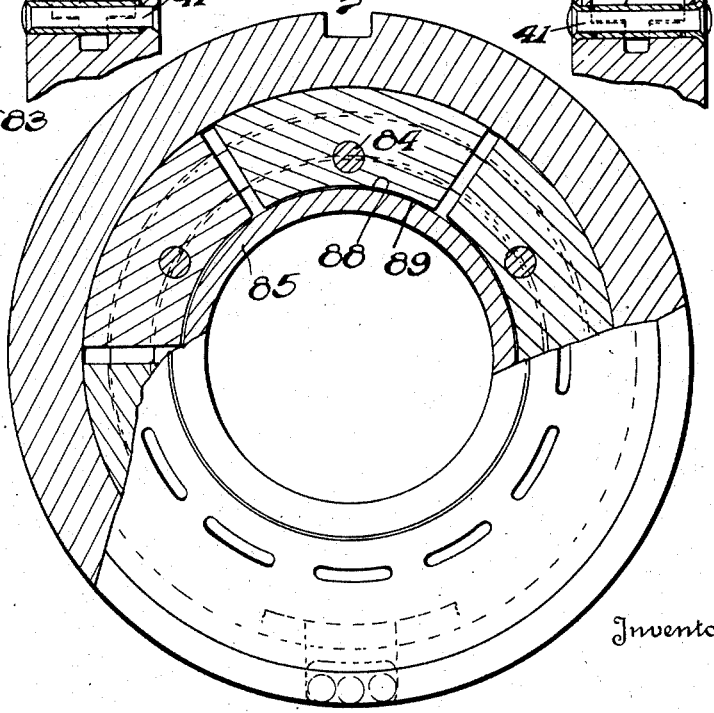
Inventor
Albert Kingsbury.
By
Cameron, Kerkam + Sutton  Attorneys Patented Mar. 25, 1941

2,235,931

UNITED STATES PATENT OFFICE 2,235,931

BEARING

Albert Kingsbury, Greenwich, Conn., assignor to Kingsbury Machine Works, Inc., Philadelphia, Pa., a corporation of Delaware Application May 24, 1938, Serial No. 209,845

12 Claims. (Cl. 308—73)

This invention relates to bearings, and more particularly to bearings of the type which employ tiltable bearing shoes for establishing and maintaining oil films between relatively moving bearing surfaces in accordance with the principles of the Kingsbury bearing.

The present invention is susceptible of embodiment in thrust bearings, radial bearings, and combined radial and thrust bearings, and for purposes of illustration a few of the numerous forms of bearing in which this invention may be embodied are disclosed herein, but as will be apparent to those skilled in the art from the following discussion the invention may be equally applied to many other forms of bearing than illustrated.

Although the loss of energy due to friction in bearings of the type employing tiltable bearing shoes is relatively low as compared with the loss of energy because of friction in other forms of surface bearings, for example, there are still relatively large quantities of heat generated at the bearing surfaces, and this heat must be dissipated if the bearing is to be kept at the relatively low temperature desired. The larger the bearing or the greater the load, the more difficult becomes this problem of rapidly dissipating the heat so as to avoid undue loss of viscosity in the lubricant, undue local rise of temperature in some portion of the bearing, difficulties arising from excessive or unequal expansion, etc.

It is an object of this invention to provide a bearing employing tiltable bearing shoes with means whereby heat may be rapidly dissipated from the bearing members to the end that the bearing parts may be maintained at a lower and more uniform temperature even though the load per unit of area of bearing surface be relatively high.

Another object of this invention is to provide a device of the type characterized which assures that the heat generated at the bearing surfaces wil be rapidly conducted to portions of the bearing structure where it may be efficiently and conveniently removed, as by water cooling, air cooling, etc.

Another object of this invention is to provide a device of the type characterized which minimizes the danger of localized overheating in the bearing structure with consequent excessive expansion due to the high temperature.

Another object of this invention is to provide a device of the type characterized which effects the efficient dissipation of the heat from the bearing structure to the end that the bearing may run at a lower temperature, smaller clearances may be used where expansion must be provided for, and undue lowering of the viscosity of the lubricant through temperature effects may be avoided.

Another object of this invention is to provide a form of means for rapidly dissipating heat from tiltable bearing members which may be embodied in bearings of a wide variety of types and sizes.

Another object of this invention is to provide means for rapidly dissipating heat from tiltable shoes which may be incorporated in the shoes without materially interfering with the proper movement of the shoes to establish and maintain the desired oil films.

Another object of this invention is to provide means for rapidly dissipating heat from tiltable bearing shoes which may employ relatively large areas through which the heat is dissipated while at the same time preserving the necessary freedom of movement for the shoes so that the appropriate oil films may be established and maintained.

Another object of this invention is to provide means for rapidly and efficiently dissipating heat from tiltable bearing shoes which may be readily incorporated in the bearing structure without undue increase of complexity, bulkiness, cost of production, etc.

Other objects of the present invention will appear as the description thereof proceeds.

The invention is capable of receiving a variety of mechanical expressions, several of which are illustrated on the accompanying drawings, but it is to be expressly understood that the drawings are for purposes of illustration only, and are not intended as a definition of the limits of the invention, reference being had to the appended claims for that purpose.

In the drawings, wherein the same reference characters are employed to designate corresponding parts in the several figures:

Fig. 1 is a fragmentary plan view of a tiltable bearing shoe embodying the present invention;

Fig. 2 is a cross section of Fig. 1 on the line 2—2 thereof;

Fig. 3 is a fragmentary plan view of a tiltable bearing shoe embodying another form which the present invention may take;

Fig. 4 is an elevation, partly in section, of the embodiment of Fig. 3;

Fig. 5 is a schematic view of a thrust bearing embodying another form of the present invention;

Fig. 6 is a similar view of a spherical bearing embodying the present invention;

Fig. 7 is a corresponding view of another embodiment of the present invention;

Fig. 7a is a sectional view on the line 7a—7a of Fig. 7;

Fig. 8 is a diametrical section schematically illustrating another embodiment of the present invention;

Fig. 9 is a side view of the embodiment of Fig. 8 with parts broken away;

Fig. 10 is a diametrical section schematically illustrating another embodiment of the present invention;

Fig. 11 is a side view of the embodiment of Fig. 10 with parts broken away;

Fig. 12 is a diametrical view schematically illustrating another embodiment of the present invention;

Fig. 13 is a side view of the embodiment of Fig. 12 with parts broken away; and

Figs. 14 and 15 are fragmentary details of two forms which may be assumed by the pivot pins.

Bearing shoes are commonly mounted spherically or cylindrically faced bosses at the rear of the shoes, or on the ends of jack screws, so that the shoe has point or line contact, theoretically, with its support. Although the load results in a departure from the line or point contact, the area of contact between each shoe and its support is still relatively small, and as the heat generated in the shoe, in order that it can pass by conduction to the support, must pass through this relatively small area, which tends to act like a "bottle neck," undue heating may occur in the shoe. Even if the shoe is mounted on a transverse pivot pin, as has been suggested, the clearance provided between the pin and the shoe or the pin and its support, as the case may be, again results in relatively small areas of physical contact under load, or small cross section of metal through which heat conduction may occur, so that undue heating may result. At the same time, if the shoe is to be free to tilt so as to establish and maintain the proper oil film between the relatively moving bearing surfaces, something in the nature of a point or line support must be used, whether it be a spherical or cylindrical faced boss, a jack screw, a pivot pin, a flexible neck, or the like, if the requisite freedom of movement is to be preserved without undue frictional opposition to the desired movement of the bearing shoe.

The present invention provides means for rapidly and efficiently dissipating heat from a tiltable bearing shoe, by its rapid conduction to parts of the bearing structure which may be conveniently cooled by circulating water, air, etc., to the end that the heat may be withdrawn from the bearing structure as rapidly as it is generated at the bearing surfaces, and thereby lower and more uniform temperatures may be maintained, while still retaining the point or line type of contact of the shoe with its support so as to facilitate movement of the shoe to the desired position for establishing and maintaining an appropriate wedge-shaped oil film.

In the form shown in Fig. 1, 20 is a bearing shoe of any suitable size, construction and material. While illustrated as a shoe for a thrust bearing adapted to cooperate with an opposed flat surface, the shoe could equally well be that of a radial or combined radial and thrust bearing and suitably shaped to cooperate with an opposed cylindrical, spherical, conical or other suitable bearing surface. As illustrated, shoe 20 is provided with the usual block 21 having a spherically faced boss 22 (compare Fig. 4) adapted to make pivotal contact with an opposed supporting surface which may take the form of a hardened insert 23. As is apparent and understood in the art, the spherically faced boss could be provided on the supporting element, here shown as a base ring 24, or the shoe could be mounted on the end of a jack screw or otherwise suitably supported for pivotal movement.

In accordance with the present invention the supporting element 24 is provided with a plurality of circumferentially extending slots 25, here shown as concentric with the center of the shaft, forming intermediate ribs or flanges 26, and the shoe is provided with a like number of rearwardly extending and similarly shaped ribs or flanges 26', forming interposed slots 25', said ribs 26 and 26' adapted to have a relatively close fit in said slots 25 and 25'. Any suitable number of slots and ribs may be used, Fig. 1 illustrating five, but the number may be larger or smaller, depending upon the size of the bearing, the unit load, and other factors. The slots 25 and 25' and the ribs 26 and 26' have such axial dimensions that the tips of the ribs are out of contact with the bottoms of the slots. The shoe is supported only at the surfaces 22 and 23 so that the shoe is free to tilt thereat.

The ribs 26 and 26' and the slots 25 and 25' have such dimensions in a radial direction as to provide a close fit without interfering with the desired pivotal movement of the shoe. If non-expansive materials are employed, the clearances between the ribs and slots may be reduced to a minimum. If expansive materials are employed somewhat greater clearances may be required, but inasmuch as any increase in temperature tends to enlarge the slots as well as the ribs and both parts are at substantially the same temperature, so that the expansion of one tends to compensate for the expansion of the other, relatively small clearances may still be used. Even if one face of each rib, for example, may be out of physical contact with the corresponding face of its slot, there is still a relatively large area of contact between the remaining faces of the ribs and slots, so that ample opportunity is afforded for the rapid and uniform flow of heat from the shoe 20 to its supporting member 24 at all times.

Member 24 may be a stationary or a rotatable part, but in either event it is a member that may be readily cooled or have such a large area of physical contact with other parts of the bearing structure that it will lead the heat away to some readily cooled part as fast as it flows from the shoe. As shown member 24 is a base ring and passages 27 for circulating cooling water are shown therein. However, as will be apparent to those skilled in the art, reliance may be placed on air cooling, with or without means for circulating the cooling air, depending upon whether the quantities of heat to be dissipated are such as to make air cooling adequate, or other suitable forms of cooling may be used.

The embodiment of Figs. 3 and 4 is similar to the embodiment of Figs. 1 and 2 except that the ribs 28 and slots 29 are shown as concentrically arranged with respect to the pivot center of the shoe, instead of concentrically arranged with respect to the axis of the shaft. There is sufficient flexibility in the ribs of both of the embodiments so far described to enable the shoe to tilt and assume its proper position for establishing and maintaining the desired oil film. In place of ribs and slots concentric with the axis of the shaft or the pivot center of the shoe, other shapes of ribs and slots, as well as other numbers of ribs and slots may be employed, as will now be apparent.

Fig. 5 illustrates schematically a thrust bearing for a shaft 30 carrying a thrust collar or runner 31 which cooperates with any suitable number of bearing shoes 32 mounted on a stationary base ring 33. While the shoes may be mounted on jack screws or curved bosses as in Figs. 1 to 4, this embodiment illustrates the use of pivot pins 34 for tiltably mounting the shoes. As here shown each shoe is provided with a pair of rearwardly extending ribs 35 and an intermediate relatively deep slot 36, and the base ring is suitably formed so as to provide recesses or slots 37 for the ribs 35 and a rib 38 to be received in the slot 36. Pivot pin 34 passes through the ribs 35 and is mounted at its ends in the outer and inner peripheral portions 39 and 40 of the base ring.

A simple pin may be used for the pivot and it may be either fixed to the base ring for relative movement of the shoe thereon or fixed to the shoe for relative movement with respect to the base ring. In place of a simple pivot pin, however, a pin surrounded by a sleeve as shown in Figs. 14 and 15 may be used. Such a construction enables the use of a pin of relatively soft material and a surrounding sleeve which may be made of relatively hard or hardened material. In Fig. 14 the pin 41 is shown as riveted at its opposite ends into the corresponding portions of the base ring, and the surrounding sleeve 42 is also fixed in position when the pin 41 is upset or otherwise secured in place. In Fig. 15, on the other hand, the sleeve is subdivided into an intermediate portion 43 which may move relatively to the pin 41 and end portions 44 which are fixed in place when the ends of the pin 41 are upset or otherwise secured to the corresponding portions of the base ring.

In the embodiment of Fig. 5 a retaining plate 45 is shown as suitably secured at one extremity into a groove 46 in the base ring with its opposite extremity 47 bent into, but not secured to the wall of, a groove 48 in the runner 31.

Fig. 6 illustrates a corresponding embodiment of the present invention but applied to a spherical bearing rather than to a plane thrust bearing. In this embodiment the shoes 50 are mounted on the runner 51 and have spherical bearing surfaces 52 which cooperate with a correspondingly curved bearing surface 53 on the stationary element 54. Each bearing shoe is pivotally mounted on a pivot pin 55, which may be of any suitable construction as heretofore pointed out, and each shoe has a plurality of ribs 56 which cooperate with corresponding slots 57 in the runner 51. A retaining plate 58 may be employed as in the embodiment of Fig. 5.

The embodiment of Fig. 7 in general corresponds to the embodiment of Fig. 6 except that the shoes 50 are here illustrated as pivotally mounted on the stationary member 54 instead of on the rotatable member 51. Otherwise, the construction is or may be the same. While in these two embodiments of Figs. 6 and 7 the convex bearing surface has been provided on the shoes, and the concave bearing surface has been provided on the base ring or the runner, respectively, it will be apparent that the shoes may be provided with the concave bearing surface and the runner or base ring may be provided with the convex bearing surface.

Where as in Figs. 5, 6 and 7 for example, the ribs and slots on the shoe and its supporting member are straight, they may be made of curvilinear contour as illustrated in Fig. 7a. As here shown the ribs 56 on shoe 50 have convex edges 59 and the bottoms of the slots 60 are correspondingly concave. This leaves more metal in and correspondingly strengthens the member supporting the shoe or shoes. This construction also has the advantage that it enables the slots to be cut by a milling cutter, as indicated by the dot and dash lines at 61.

While thrust and spherical bearings, i. e., combined thrust and radial bearings, have only been illustrated in the embodiments so far described, it is apparent that shoes of like or similar construction may be used in any suitable form of radial bearing, being provided with cylindrical, rather than plane or spherical bearing surfaces, and in this event they may be mounted either on the stationary or the rotatable element of the bearing.

Figs. 8 and 9 illustrate an embodiment of the present invention for use as a radial bearing and in which the structure is made axially narrow so that it is adapted to occupy the space ordinarily provided for a ball or roller bearing. As here shown ring 62 is adapted to be mounted on a shaft and retained thereon for rotation therewith in any suitable way. Pivotally mounted on ring 62, as by pivot pins 63 which may be of any suitable construction as heretofore pointed out, are any suitable number of bearing shoes 64 provided with ribs 65 which cooperate with corresponding slots 66 in accordance with the principles of the present invention. Each bearing shoe 64 has a spherical bearing surface for cooperation with a corresponding bearing surface mounted on a stationary ring 67 which is designed to be held in the bearing housing in any suitable way, and retained against relative rotation, as by a dowel pin coacting with the slot 68. Ring 67 is preferably made in halves suitably united for convenience of assembly, or it may be split upon a median radial plane with the halves suitably secured together, or it can be made in one piece in view of the use of spherical bearing surfaces. On the other hand the bearing surfaces may be made of cylindrical or other suitable shape, if preferred.

Suitable retaining plates 69 are shown secured in grooves 70 formed in the stationary ring 67 and are provided with suitable apertures 71 so that oil may flow into and out of the spaces which communicate with the bearing surfaces. To equalize the pressure in the oil at opposite sides of the bearing structure, ring 67 may be provided with one or more apertures extending axially through the same as indicated at 71'. In this embodiment of the invention the amount of sphericity provided in the bearing surface in an axial direction is not sufficient to enable the bearing to function as a thrust bearing to any substantial extent. If desired, however, the same type of construction may be employed in a bearing whose bearing surfaces are so shaped that the structure may function both as a thrust and a radial bearing. When such is done the curvature of the bearing surface in an axial direction may be appropriately increased, using a single circumferential set of bearing shoes, or as shown in the embodiments of Figs. 10 to 13, the axial length of the bearing surfaces may be increased and the bearing include two circumferential sets of bearing shoes, the two sets being staggered as shown in Fig. 10 or having their respective members axially aligned as shown in Fig. 12.

In the embodiment of Figs. 10 and 11 the rotatable ring 72 is provided with two circumferential sets of shoes 73, the two sets having their members in staggered relationship, each shoe being pivotally mounted on the ring 72 as by pivot pin 74, and each shoe having a spherical bearing surface 75 for coaction with a corresponding surface 76 on the stationary ring 77. As in other embodiments of the present invention each shoe is provided with rearwardly extending ribs 78 for reception in corresponding slots 79. Otherwise the structure is, or may be, the same as heretofore described in conjunction with the embodiment of Figs. 8 and 9. Where the shoes are arranged in staggered relationship as here shown, the slots therefor may be conveniently formed by milling at an angle to the axis of the ring, in which event the ribs and slots on the shoes and ring may be respectively of convex and concave outline as illustrated at 80 and 81 in Fig. 11.

In Fig. 12 the two sets of shoes 82 and 83 have their members in axial alignment, in which event a single pivot pin 84 may be used for mounting both shoes of each pair on the rotatable ring 85, or separate pivot pins may be used as preferred. As in other embodiments each shoe has a plurality of ribs 86 which cooperate with corresponding slots 87 in the ring 85. Otherwise the construction may be the same as in Figs. 10 and 11, or as shown in this embodiment as well as in the embodiment of Figs. 8 and 9, the ribs on the shoes may have concave edges 88 and the slots 89 may be of convex outline at their bottoms.

In place of having two circumferential sets of bearing shoes cooperating with a single bearing member, as in the embodiments of Figs. 10 to 13 inclusive, the bearing may be composed of two or more separate sets of spherically faced shoes each having its own cooperating bearing member, in which event the shoes may face in the same direction for taking thrust in the same direction, or they may be faced in opposite directions, with their cooperating bearing members back to back, so as to take thrust in opposite directions, all as will be apparent to those skilled in the art. While the shoes have been shown as mounted on the rotatable bearing member in the embodiments of Figs. 8 to 13 inclusive it will be apparent that they could be mounted on the stationary member as may be seen from a comparison of Figs. 6 and 7.

It is to be understood that any suitable means may be provided for supplying the bearing surfaces of each of these embodiments with lubricating oil.

In all of the embodiments illustrated and described, whether the shoes are incorporated in a thrust bearing or a radial bearing or a combined thrust and radial bearing, or whether the bearing is composed of one or more sets of bearing shoes, and whether facing in the same or opposite directions, each shoe is suitably mounted for tiltable movement so as to establish and maintain the desired wedge-shaped oil film, and yet each shoe is provided with a relatively large area of contact with its supporting member, so that ample facility is provided for heat flow from the shoe to its supporting member notwithstanding the approximate point or line contact provided at the pivot. The area of such contact may be varied within relatively wide limits, depending upon the size of the bearing, the quantity of heat to be dissipated, etc. Ordinarily it should be large as compared with the cross section of the shoe to the end that as the heat flows away from the bearing surface it shall not be obstructed by a reduction in cross section through which it must pass in order that it may escape to some member or members from which it may be readily dissipated, as by air cooling, water cooling, or the like. Where the shoes are mounted on the stationary member, as a base ring or housing, provision of water cooling means is relatively simple, although air cooling may be employed, particularly where the shoes are in conductive relationship with the housing. Where the shoes are mounted on a rotatable member, the conductive path may have to be through a thrust collar to the shaft or through a rotatable bearing ring to the shaft, etc., but the areas of contact or cross section in these latter parts may always be made such as to provide for the desired heat flow.

Therefore the present invention provides means whereby heat may be readily led away from the bearing shoes to a member that can be readily cooled while retaining the approximately point or line contact between the shoe and its supporting member in order to provide the proper pivotal mounting of the shoes. No "bottle neck" for the heat exists, but the heat may flow away from each shoe as rapidly as it is generated at the bearing surfaces. Thus the bearing may be kept at a lower temperature than heretofore possible, which in turn makes it possible to employ higher unit pressures inasmuch as such high pressures do not result in dangerous temperature conditions. Also, as the present construction provides for the free flow of heat from the oil films, local overheating with excessive expansion, loss of oil viscosity, etc., are avoided. At the same time, the present invention provides for the dissipation of heat through use of means that are relatively simple in construction and easily applied to all varieties of bearings.

While typical embodiments of the present invention have been described with considerable particularity, it is to be expressly understood that the invention is not restricted thereto. The invention may be applied to single shoes or to any suitable number of shoes, arranged in any suitable way and of any suitable size and construction. Other forms of means for tiltably mounting the shoes, such as integral necks, etc., may be used. Also as will be apparent to those skilled in the art, features illustrated in one or more embodiments may be used in other embodiments, means for pivotally mounting the shoes shown only in conjunction with one form may be used with other forms, certain features may be used without other features, etc., and various other combinations and arrangements may be employed than those hereinbefore described. Reference is therefore to be had to the appended claims for a definition of the invention.

What is claimed is:

1. In a bearing, the combination of rotatable bearing members including one or more bearing shoes provided with means for mounting the same whereby each shoe may tilt to provide a wedge-shaped oil film, a support on which said mounting means for each shoe is carried, and means in addition to said means for tiltably mounting each shoe and including a plurality of cooperating ribs and slots between each shoe and its support for rapidly conducting heat from said shoe to its support, said means providing a heat-conducting path which is independent of said mounting means.

2. In a bearing, the combination of rotatable bearing members including one or more bearing shoes provided with means for mounting the same whereby each shoe may tilt to provide a wedge-shaped oil film, a support on which each shoe is tiltably mounted, and means between each shoe and its support in addition to said means for tiltably mounting the shoe for rapidly conducting heat from said shoe to its support, said means including relatively movably contacting surfaces on the shoe and its support which are substantially coextensive with one dimension of the shoe and which remain in contact during the tilting of the shoe.

3. In a bearing, the combination of rotatable bearing members including one or more bearing shoes provided with means for mounting the same whereby each shoe may tilt to provide a wedge-shaped oil film, a support on which each shoe is tiltably mounted, and means between each shoe and its support in addition to said means for tiltably mounting the shoe for rapidly conducting heat from the shoe to its support, said means including relatively movable coacting rib and slot means between the shoe and support with lateral walls in surface contact to provide relatively large areas for heat flow, each rib having a cross section transversely of the shoe which is small as compared to the transverse dimension of the shoe.

4. In a bearing, the combination of rotatable bearing members including one or more bearing shoes provided with means for mounting the same whereby each shoe may tilt to provide a wedge-shaped oil film, a support on which each shoe is tiltably mounted, and means between each shoe and its support in addition to said means for tiltably mounting the shoe for rapidly conducting heat from the shoe to its support, said means including relatively movable portions on the shoe and its support in surface contact and substantially coextensive with the circumferential length of the shoe.

5. In a bearing, the combination of rotatable bearing members including one or more bearing shoes provided with means for mounting the same whereby each shoe may tilt to provide a wedge-shaped oil film, a support on which each shoe is tiltably mounted, and a plurality of contacting ribs and slots on the shoe and its support to provide relatively large areas in face contact for rapidly conducting heat from the shoe to its support.

6. In a bearing, the combination of rotatable bearing members including one or more bearing shoes provided with means for mounting the same whereby each shoe may tilt to provide a wedge-shaped oil film, a support on which each shoe is tiltably mounted, and relatively movable rib and slot means between each shoe and its support for rapidly conducting heat from the shoe to its support, each rib having an arcuate edge and its coacting slot having a mating arcuate bottom.

7. In a bearing, the combination of rotatable bearing members including one or more bearing shoes, a pivot pin on which each shoe is pivotally mounted so that it may tilt to provide a wedge-shaped oil film, a support for said shoe in which said pivot pin is mounted, and means including a plurality of ribs and slots on said shoe and support for rapidly conducting heat from said shoe to said support without passing through said pivot pin.

8. In a bearing, the combination of rotatable bearing members including one or more bearing shoes provided with means for mounting the same whereby each shoe may tilt to provide a wedge-shaped oil film, a support on which said mounting means for each shoe is carried, and rib and slot means on said shoe and its support in addition to said means for tiltably mounting the shoe and including relatively movable interengaged contacting annular surfaces for rapidly conducting heat from said shoe to its support.

9. In a bearing, the combination of rotatable bearing members including one or more bearing shoes provided with a pivot pin for mounting the same and on which the shoe may tilt to provide a wedge-shaped oil film, a support for said shoe in which said pivot pin is mounted, and a plurality of coacting ribs and slots on said shoe and support disposed along the length of said pivot pin for rapidly conveying heat from said shoe to its support, said pivot pin passing through said ribs.

10. In a bearing, the combination of rotatable bearing members including one or more bearing shoes provided with means for mounting the same whereby each shoe may tilt to provide a wedge-shaped oil film, said mounting means including a pin carrying a sleeve on which the shoe is mounted, a support for each shoe in which said pin is mounted, and additional means between each shoe and its support extending substantially the entire circumferential length of the shoe for rapidly conducting heat from said shoe to its support.

11. In a bearing, the combination of relatively movable bearing members including one or more bearing shoes, a support for each shoe, means mounting each shoe to tilt with respect to its support, and means including a plurality of cooperating ribs and slots between each shoe and its support for providing outside of said mounting means relatively large areas of metal in relatively movable face contact for rapidly conducting heat from said shoe to its support through a heat-conducting path that is independent of said mounting means.

12. In a bearing, the combination of relatively movable bearing members including one or more bearing shoes, a support for each shoe, a pivot pin on which each shoe is pivotally mounted to tilt with respect to said support, and means between each shoe and its support in addition to said mounting means for rapidly conducting heat from said shoe to said support, said means including a plurality of ribs on each shoe cooperating with slots in said support.

ALBERT KINGSBURY.